US009768578B1

United States Patent
Jiang et al.

(10) Patent No.: US 9,768,578 B1
(45) Date of Patent: Sep. 19, 2017

(54) ULTRASHORT PULSE FIBER AMPLIFIER USING RARE-EARTH DOPED GAIN FIBERS

(71) Applicant: AdValue Photonics, Inc., Tucson, AZ (US)

(72) Inventors: Shibin Jiang, Tucson, AZ (US); Tao Luo, Tucson, AZ (US); Qing Wang, Tucson, AZ (US); Lei Pan, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 0 days.

(21) Appl. No.: 15/596,223

(22) Filed: May 16, 2017

Related U.S. Application Data

(60) Division of application No. 14/802,861, filed on Jul. 17, 2015, which is a continuation-in-part of application No. 14/605,740, filed on Jan. 26, 2015, now Pat. No. 9,581,760.

(51) Int. Cl.
| | |
|---|---|
| *G02B 6/036* | (2006.01) |
| *H01S 3/06* | (2006.01) |
| *H01S 3/16* | (2006.01) |
| *H01S 3/067* | (2006.01) |

(52) U.S. Cl.
CPC ......... *H01S 3/06716* (2013.01); *G02B 6/036* (2013.01); *H01S 3/06733* (2013.01); *H01S 3/1608* (2013.01); *H01S 3/06712* (2013.01); *H01S 3/161* (2013.01); *H01S 3/1616* (2013.01); *H01S 3/1618* (2013.01)

(58) Field of Classification Search
None
See application file for complete search history.

(56) References Cited

U.S. PATENT DOCUMENTS

| | | |
|---|---|---|
| 4,848,998 A | 7/1989 | Snitzer et al. |
| 5,499,134 A | 3/1996 | Galvanauskas et al. |
| 6,529,318 B1 | 3/2003 | Kaneda et al. |
| 6,654,390 B2 | 11/2003 | Spiegelberg et al. |
| 6,700,697 B2 | 3/2004 | Nikolajsen et al. |
| 6,816,514 B2 | 11/2004 | Jiang et al. |
| 6,859,606 B2 | 2/2005 | Jiang et al. |
| 7,298,768 B1 | 11/2007 | Jiang |
| 7,423,803 B1 | 9/2008 | Chavez-Pirson et al. |
| 8,121,154 B2 | 2/2012 | Jiang et al. |
| 8,503,069 B2 | 8/2013 | Fermann et al. |
| 8,659,821 B2 | 2/2014 | Schimpf et al. |
| 8,774,590 B2 | 7/2014 | Ichii et al. |
| 2004/0109225 A1 | 6/2004 | Hu et al. |
| 2006/0029343 A1 | 2/2006 | Farroni et al. |
| 2007/0165993 A1 | 7/2007 | Kondo et al. |
| 2013/0114129 A1 | 5/2013 | Alkeskjold |
| 2013/0301115 A1 | 11/2013 | Dong et al. |

*Primary Examiner* — Jerry Rahll
(74) *Attorney, Agent, or Firm* — Yakov S. Sidorin; Quarles & Brady LLP

(57) ABSTRACT

Ultrashort pulse fiber amplifier having a pulse width from 200 ps to 200 fs comprising a rare earth oxide doped multicomponent glass fibers for laser amplification, including a core and a cladding, the core comprising at least 2 weight percent glass network modifier selected from BaO, CaO, MgO, ZnO, PbO, $K_2O$, $Na_2O$, $Li_2O$, $Y_2O_3$, or combinations; wherein the mode of the core is guided with step index difference between the core and the cladding, a numerical aperture of the fiber is between 0.01 and 0.04; core diameter is from 25 to 120 micron, and a length of the gain fiber is shorter than 60 cm.

5 Claims, 4 Drawing Sheets

ULTRASHORT PULSE FIBER AMPLIFIER USING RARE-EARTH DOPED GAIN FIBERS

CROSS-REFERENCE TO RELATED APPLICATIONS

This Application is a divisional from U.S. patent application Ser. No. 14/802,861, filed on Jul. 17, 2015 and now published as US 2016/0218478, which in turn is a continuation-in-part from U.S. patent application Ser. No. 14/605,740 filed on Jan. 26, 2015 and now patented as U.S. Pat. No. 9,581,760. The disclosure of each of the above-mentioned patent documents is incorporated herein by reference.

FIELD OF THE INVENTION

This disclosure relates to ultrashort pulse fiber amplifiers with pulse width from 200 ps to 200 fs and comprising rare-earth doped gain fibers.

BACKGROUND

High-power, pulsed fiber lasers are of great interest in applications such as laser micromachining, material processing, nonlinear optics, and laser sensing. Prior art high power fiber lasers are commonly achieved via the means of making a fiber-based master-oscillator-power-amplifier (MOPA).

SUMMARY

A 1.01 to 1.12 micron wavelength ultrashort pulse fiber amplifier with pulse width from 200 ps to 200 fs comprising a Ytterbium doped multicomponent glass fiber for laser amplification from about 1.01 to about 1.12 micron wavelength is disclosed. Applicants' Ytterbium doped multicomponent glass fiber comprises a core and a cladding. The fiber amplifier does not comprise a pulse stretching or a pulse compressing device.

The core glass of Applicants' Ytterbium doped multicomponent glass fiber contains at least 2 weight percent glass network modifier selected from BaO, CaO, MgO, ZnO, PbO, $K_2O$, $Na_2O$, $Li_2O$, $Y_2O_3$, or combinations and ytterbium oxides from about 3 to about 50 weight percent. The mode of the core is guided with step index difference between the core and the cladding, and the numerical aperture of the fiber is between about 0.01 and about 0.04. The core diameter is from about 25 to about 60 micron. The length of the gain fiber is shorter than 60 cm.

A 1.51 to 1.65 micron wavelength ultrashort pulse fiber amplifier with pulse width from 200 ps to 200 fs comprising an Erbium doped multicomponent glass fiber for laser amplification from 1.51 to 1.65 micron wavelength is disclosed. Applicants' Erbium doped multicomponent glass fiber comprises a core, a cladding. The fiber amplifier does not comprise a pulse stretching or a pulse compressing device.

The core glass of the fiber contains at least 2 weight percent glass network modifier selected from BaO, CaO, MgO, ZnO, PbO, $K_2O$, $Na_2O$, $Li_2O$, $Y_2O_3$, or combinations and ytterbium oxide from about 0.5 to about 20 weight percent. The mode of the core is guided with step index difference between the core and the cladding, and the numerical aperture of the fiber is between about 0.01 and about 0.04. The core diameter is from about 30 to about 90 microns. The length of the gain fiber is shorter than 60 cm.

A 1.75 to 2.05 micron wavelength ultrashort pulse fiber amplifier with pulse width from 200 ps to 200 fs comprising a Thulium doped multicomponent glass fiber for laser amplification from 1.75 to 2.05 micron wavelength is disclosed. Applicants' Thulium doped multicomponent glass fiber comprises a core and a cladding. The fiber amplifier does not comprise a pulse stretching or a pulse compressing device.

The core glass of the fiber contains at least 2 weight percent glass network modifier selected from BaO, CaO, MgO, ZnO, PbO, $K_2O$, $Na_2O$, $Li_2O$, $Y_2O_3$, or combinations and ytterbium oxide from about 2 to about 30 weight percent. The mode of the core is guided with step index difference between the core and the cladding, and the numerical aperture of the fiber is between about 0.01 and about 0.04. The core diameter is from about 35 to about 120 micron. The length of the gain fiber is shorter than 60 cm.

A 1.98 to 2.2 micron wavelength ultrashort pulse fiber amplifier with pulse width from 200 ps to 200 fs comprising a Holmium doped multicomponent glass fiber for laser amplification from 1.98 to 2.2 micron wavelength is disclosed. Applicants' Holmium doped multicomponent glass fiber comprises a core and a cladding. The fiber amplifier does not comprise a pulse stretching or a pulse compressing device.

The core glass of the fiber contains at least 2 weight percent glass network modifier selected from BaO, CaO, MgO, ZnO, PbO, $K_2O$, $Na_2O$, $Li_2O$, $Y_2O_3$, or combinations and ytterbium oxide from about 0.5 to about 20 weight percent. The mode of the core is guided with step index difference between the core and the cladding, and the numerical aperture of the fiber is between about 0.01 and about 0.04. The core diameter is from about 35 to about 120 microns. The length of the gain fiber is shorter than 60 cm.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

High-power, pulsed fiber lasers are of great interest in applications such as laser micromachining, material processing, nonlinear optics, and laser sensing. High power fiber lasers are commonly achieved via the means of making a fiber-based master-oscillator-power-amplifier (MOPA). So the fiber amplifier is critical for the laser systems.

Figure 1:
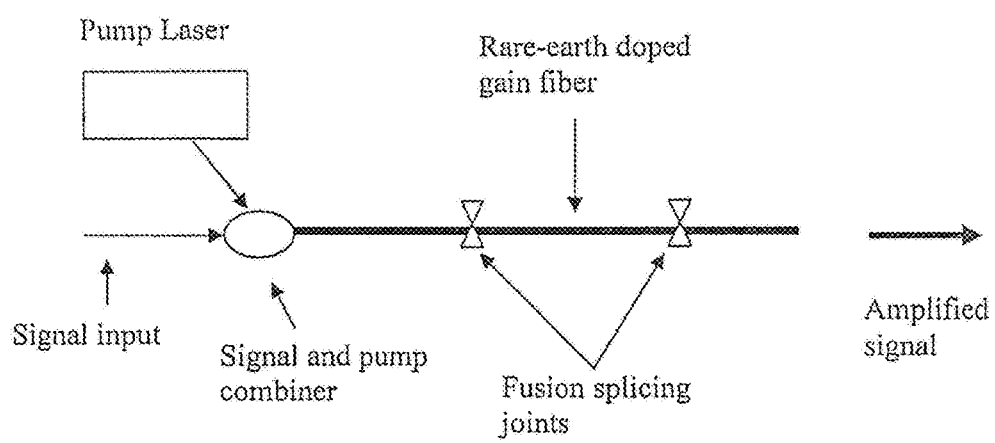
FIG. 1 illustrates a schematic of a prior art fiber-based master-oscillator-power-amplifier (MOPA)

FIG. 1 illustrates the schematic of MOPA configuration. The seed laser is amplified by a fiber amplifier. Typically the seed laser is amplified by a rare-earth doped gain fiber, which is energized by pump laser.

Figure 2:
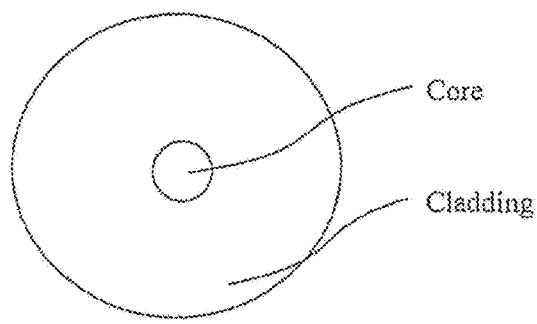
FIG. 2 illustrates a cross section view of Applicants' rare-earth doped fiber.

FIG. 2 shows the cross section view of a rare-earth doped fiber. The pump laser is combined together with seed laser via the so-called signal and pump combiner. The amplified seed laser can be amplified again in order to achieve higher pulse energy and higher peak power. When more than one amplifier is used, the fiber amplifiers are called multi-stage amplifiers. In order to achieve high power, double-cladding rare-earth doped gain fiber is typically used.

Figure 3:
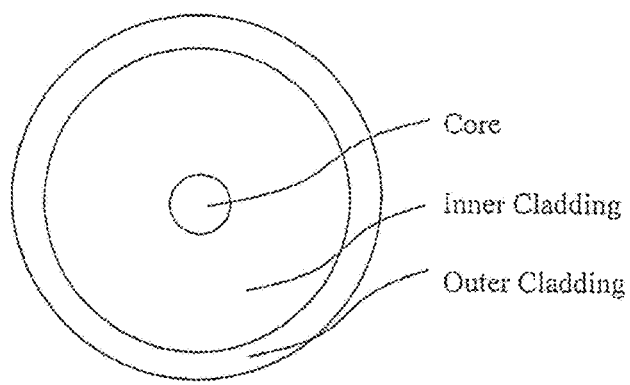
FIG. 3 illustrates a cross section view of Applicants' double cladding rare-earth doped fiber.

FIG. 3 illustrate the typically cross section view of double cladding gain fiber. The core is used to guide the signal. Here it is called seed laser. The inner cladding is used to confine the pump lasers. The core is typically rare-earth doped glass. The rare-earth ion produces gain. For example, ytterbium ion ($Yb^{3+}$) and neodymium ($Nd^{3+}$) offer gain near 1 micron wavelength, erbium ion ($Er^{3+}$) produces gain near 1.55 micron, thulium ion ($Tm^{3+}$) and holmium ion ($Ho^{3+}$) can produce gain near 2 micron wavelength.

The inner cladding is typically undoped glass material with a lower refractive index in order to form waveguide in the core. The external cladding layer can be glass material or polymer material, which has a lower refractive index to confine the pump laser in the inner cladding. In order to generate polarization maintaining (PM) output, PM gain fiber is needed.

Figure 4:
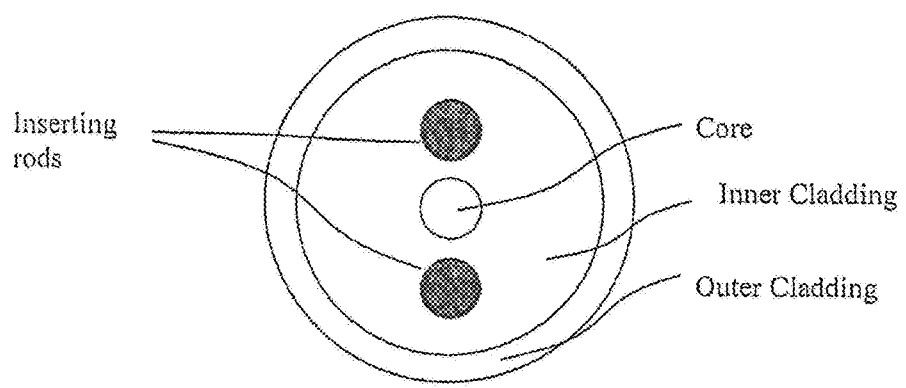
FIG. 4 illustrates a cross section view of Applicants' polarization maintaining double cladding rare-earth doped fiber.

FIG. 4 illustrates the cross section view of a typical PM fiber.

High pulse energy and high peak power is needed for many applications. Due to the strong transverse confinement and long interaction length, power scaling of fiber amplifier is limited by the onset of nonlinear effects.

For single-frequency/narrow-band amplifiers, stimulated Brillouin scattering (SBS) has the lowest threshold and possibly causes much of the signal light to be reflected back. For broader signal bandwidth, stimulated Raman scattering (SRS) can happen at higher power levels and transfer a lot of signal power into unwanted new wavelength components.

The SBS threshold power for narrow band signal is determined by the following equation 1:

$$P_{B0} = \frac{21bA_e}{g_B L_e}, \quad (1)$$

where b is a number between 1 and 2 which depends on polarization state. $A_e$ is the effective area. $g_B$ is the SBS gain coefficient. $L_e$ is the effective transmission length of the fiber.

The threshold power for SRS can be described as the following equation (2)

$$P_{R0} = \frac{16A_e}{g_R L_e} \quad (2)$$

where $g_R$ is the SRS gain coefficient.

Therefore, the threshold of optical nonlinearity in fiber increases with the effective area and decreases with the effective transmission length of the fiber. The effective area increase with the core diameter of the fiber and the mode filed diameter of the fiber. For single mode core, the mode field diameter is typically proportional to the physical core diameter of the fiber. In order to increase the pulse energy and peak power of the fiber laser one need to increase the threshold of the optical nonlinearity of gain fiber. In order to increase the threshold of the optical nonlinearity of gain fiber, the length of the gain fiber should be short and the core diameter of the gain fiber should be large.

The length of the gain fiber is limited by pump absorption. Cladding pumped fiber amplifiers often have a length of many meters for efficiently absorbing of pump light. A high doping concentration can improve the absorption and then shorten the length of the gain fiber. However, the doping concentration of typical silica fiber is limited. So typically a few meter long gain fiber is used.

The core diameter is limited in order to ensure the fiber is single mode fiber. The beam quality will degrade and is no longer single mode when the V number of the fiber is more than 2.405, $$V = \frac{2\pi}{\lambda} aNA \quad (3)$$

where $\lambda$ is the vacuum wavelength, a is the radius of the fiber core, and NA is the numerical aperture. As can be seen in the equation (3), a lower NA value can compensate the increased core size and keep the V number as low as possible.

However there is also a limit to reduce the NA for conventional step index fiber. U.S. Pat. No. 8,774,590 disclosed a refractive index difference between the core the clad of 0.05 to 0.30% of silica fiber. This patent teaches that a light storing effect of the optical fibers cannot be sufficiently obtained when the relative refractive index difference between the core and clad is lower than 0.05%. The refractive index of silica glass is approximately 1.45. The refractive index of the core glass is 1.4507. So the NA of the fiber should be near 0.04 by using the following equation 4:

$$NA = \sqrt{n_{core}^2 - n_{clad}^2}, \quad (4)$$

Nclad=1.45
Ncore=1.45*(1+0.0005)=1.4507
Therefore NA=0.046

When the NA is 0.046, the single mode core diameters are 16.65 micron for 1 micron wavelength laser, 25.8 micron for 1.55 micron wavelength laser, and 33.3 micron for 2 micron wavelength laser in according to equation (3). Although U.S. Pat. No. 8,774,590 claims a core diameter of 20 to 30 micron for ytterbium doped fiber laser (ytterbium doped fiber laser wavelength is 1 micron), the V number is already larger than 2.405, which means it is not truly single mode fiber anymore. Fiber bending is needed in order to filter out the higher order mode. So the true single mode core diameter near 1 micron is approximately 16.65 micron.

Further, silica fibers for U.S. Pat. No. 8,774,590 are formed using MCVD (Modified Chemical Vapor Deposition) or VAD (Vapor Axial Deposition) method to deposit the core material. A problem, however, arises with these conventional optical fibers in that current optical fiber manufacturing methods are restricted in their ability to precisely control the indices of refraction of the core material ($n_{core}$) and the cladding material ($n_{clad}$). Because of this restricted ability, in commercially practical fiber, the difference between $n_{core}$ and $n_{clad}$ is usually limited by design to no less than 0.1%. This, in turn, restricts the designed size of the core diameter for a given wavelength, and/or restricts the wavelengths of single-mode operation of a fiber for a given core diameter.

For example, one common optical fiber manufacturing method referred to as flame hydrolysis uses a burner to fire a combination of metal halide particles and $SiO_2$ (called a "soot") onto a rotating graphite or ceramic mandrel to make the optical fiber perform. See Keiser, Optical Fiber Communications, 2nd ed., McGraw-Hill (1991), which is incorporated by reference herein, at pp. 63-68.

The index of refraction is controlled by controlling the constituents of the metal halide vapor stream during the deposition process. The process is "open loop" without a feedback mechanism to precisely control the ultimate index of refraction of the optical material. Moreover, the metal halide vapor stream is limited in its controllability and in its ability to control the ultimate index of refraction of the optical material.

During the process a good portion of the material will be vaporized, therefore, it is extremely difficult to control the difference of the refractive index difference to close to 0.05% (equals to NA of 0.046). So most gain fibers have NA of 0.08 or larger.

Another approach is to use the so-called photonic crystal fiber (PCF) design to achieve a large core diameter. A photonic crystal fiber (also called holey fiber, hole-assisted fiber, microstructure fiber, or microstructured fiber) is an optical fiber which obtains its waveguide properties not from a spatially varying glass composition but from an arrangement of very tiny and closely spaced air holes which go through the whole length of fiber. Such air holes can be obtained by using a preform with holes, made e.g. by stacking capillary and/or solid tubes and inserting them into a larger tube. These fibers are not step index fibers and their guiding mechanism is different from step index fibers.

Laser-active PCFs for fiber lasers and amplifiers can be fabricated, e.g., by using a rare-earth-doped rod as the central element of the preform assembly. Rare earth dopants (e.g. ytterbium or erbium) tend to increase the refractive index, the guiding properties are determined by the photonic microstructure only and not by a conventional-type refractive index difference. For high-power fiber lasers and amplifiers, double-clad PCFs can be used, where the pump cladding is surrounded by an air cladding region (air-clad fiber). Due to the very large contrast of refractive index, the pump cladding can have a very high numerical aperture (NA), which significantly lowers the requirements on the pump source with respect to beam quality and brightness.

Such PCF designs can also have very large mode areas of the fiber core while guiding only a single mode for diffraction-limited output, and are thus suitable for very high output powers with excellent beam quality.

But PCF (microstructured fiber) has many disadvantages including difficulty for fabrication, difficulty for fusion splicing, poor thermal conductivity of the air-gap, and relatively low doping in the core of the fiber. Therefore, it is strongly desired to have a step index fiber with a large core diameter, which is truly single mode fiber.

We disclose a type of gain fiber, which has a numerical aperture of between 0.01 and 0.04, resulting an extremely large single mode core diameter. Here the host of the rare-earth ions, the gain elements, is the multicomponent glasses, which is different from the most commonly used silica glass.

It is well known that silica fibers are made with vapor deposition method, which contains almost no alkali metal ions nor alkaline earth metal ions because these ions are not compatible with vapor deposition process. The total content should be less than 0.1 weight percent. Multicomponent glasses always contain alkali metal ions or alkaline earth metal ions, which is at least more than 1 weight percent.

The alkali metals include Lithium (Li), Sodium (Na), Potassium (K), and the alkaline earth metals are beryllium (Be), magnesium (Mg), calcium (Ca), strontium (Sr), and barium (Ba). These alkali metal ions or alkaline earth metal ions are called glass network modifier in multicomponent glasses. Other metal ions such as Zn and Pb can act as glass network modifiers, which again is not compatible with vapor deposit process.

Multicomponent glasses include phosphate glasses, silicate glasses, tellurite glasses, germanate glasses, et al. U.S. Pat. No. 6,816,514, in the name of Jiang disclose rare-earth doped phosphate-glass fiber for fiber laser application. U.S. Pat. No. 6,859,606 in the name of Jiang, disclose erbium doped boro-tellurite glasses for 1.5 micron fiber amplification. U.S. Pat. No. 7,298,768 in the name of Jiang, disclose germanate glasses for fiber lasers. U.S. Pat. No. 8,121,154 to Jiang disclosed silicate glasses for fiber laser applications. Multicomponent glass fibers are used for fiber laser application because of theirs capability of high doping concentrations. These patents limit their advantages of using a relatively shorter piece of gain fiber compared to silica glass fiber.

But for high pulse energy fiber lasers, a large core diameter is critical. Applicants have discovered that a large core diameter can be obtained from multicomponent glass gain fibers. The numerical aperture can be from 0.01 to 0.04. Therefore, the core diameter can be from 25 micron to 60 micron for 1 micron wavelength, 35 micron to 90 micron for 1.55 micron wavelength, and 45 micron to 120 micron for 2 micron wavelength.

Applicants doped high rare-earth ions into the fiber, so the total length of the gain fiber was no longer than 60 cm. Therefore the gain fiber could be packaged straight. No bending was necessary.

Because of the extremely large core diameter and relatively short length of gain fiber, a peak power of greater than 50 kW can be achieved without optical nonlinearity.

Applicants have developed a new cladding pumped polarization maintaining Yb doped fiber based on silicate materials. With large mode size, high Yb doping level and low NA, the fiber amplifier has achieved record high threshold for nonlinear effects while keep excellent diffraction limited beam quality. Table 1 compares the parameters of Applicants' Yb-doped fiber with most popular commercial cladding pumped Yb fibers.

TABLE 1

| | Fiber | | |
|---|---|---|---|
| | Commercial Yb1200-10/125 | Commercial Yb1200-20/125 | Applicants' Yb #35 |
| Core diameter | 10 μm | 20 μm | 30 μm |
| Estimated mode area $A_e$ | 80 μm² | 320 μm² | 720 μm² |
| NA | 0.08 | 0.08 | 0.025 |
| V number @ 1064 nm | 2.36 | 4.74 | 2.21 |
| Fiber modes | Single mode | Multimode | Single mode |
| Inner cladding diameter | 125 μm | 125 μm | 135 μm |
| Doping concentration | 1.2 weight percent | 1.2 weight percent | 10 weight percent |
| Nominal cladding absorption at 976 nm (For small signal) | ~7 dB/m | ~30 dB/m | ~500 dB/m |
| Fiber length for nominal 50 dB absorption at 976 nm | 7.1 m | 1.7 m | 0.1 m |
| Nonlinear threshold | $P_0$ | 16 $P_0$ | 640 $P_0$ |

As shown in Table 1, Applicants' fiber Yb #35 has an estimated nonlinear threshold power ~640 times higher than that of the commercial fiber.

TABLE 2 compares the SBS/SRS thresholds for different input signals between Applicants' fiber and commercial fibers. The nonlinear threshold of Applicants' fiber is many times higher than commercial fibers. The threshold of Applicants' fiber is always many times higher than the typical commercial fiber, which means high pulse energy can be achieved.

TABLE 2

| | Fiber Amplifier | | |
|---|---|---|---|
| | Commercial Yb1200-10/125 7.1 m | Commercial Yb1200-20/125 1.7 m | Applicants' Yb #35 0.1 m |
| SBS threshold for narrow band CW signal | 5.9 W | 94 W | 3.7 kW |
| SRS threshold for CW signal | 2.8 kW | 45 kW | 1.8 MW |
| SRS threshold energy for 100 ns pulse | 280 μJ | 4.5 mJ | 180 mJ |
| SRS threshold energy for 10 ns pulse | 28 μJ | 450 μJ | 18 mJ |
| SRS threshold energy for 1 ns pulse | 2.8 μJ | 45 μJ | 1.8 mJ |

Picosecond and femtosecond lasers are called ultrashort pulse lasers. In amplifiers for ultrashort optical pulses, the optical peak intensities can be very high, so that detrimental nonlinear pulse distortion or even destruction of the gain medium or of some other optical element may occur. This can be effectively prevented by employing the method of chirped-pulse amplification (CPA). Before passing through the amplifier medium, the pulses are chirped and temporally stretched to a much longer duration by means of a strongly dispersive element (the stretcher, e.g. a grating pair or a long fiber). This is called a pulse stretcher. The pulse stretcher effectively reduces the peak power to a lower level because of the long pulse width, therefore the above-mentioned detrimental nonlinear effects in the amplifiers can be avoided. Due to the inherently high nonlinearity of long fibers in fiber lasers and fiber amplifiers, CPA typically is applied for relatively low pulse energies fiber amplifiers.

After the amplifiers, a dispersive compressor is used, i.e., an element with opposite dispersion (typically a grating pair), which removes the chirp and temporally compresses the pulses to a duration similar to the input pulse duration. This is called a pulse compressor. After the pulse compression, the peak power of the amplified pulse becomes very high.

The fiber laser system disclosed in U.S. Pat. No. 5,499,134 relied upon chirped fiber Bragg gratings for pulse stretching. U.S. Pat. No. 8,503,069 B2 to Martin E. Fermann et al disclose the design of ultra-compact high energy chirped pulse amplification systems based on linearly or nonlinearly chirped fiber grating pulse stretchers and photonic crystal fiber pulse compressors. Photonic crystal fiber pulse stretchers and photonic crystal fiber compressors can be implemented. U.S. Pat. No. 8,659,821 B2 to Schimpf et al. disclose a particular design for amplifying a stretched pulse and pulse compressing of fiber laser systems.

Although those stretching and compressing techniques and devices can produce the high pulse energy and high peak power, the fiber laser system is complicated. That is one of the major reasons that ultrashort fiber laser systems are expensive.

In order to avoid pulse stretching, a linearly chirped parabolic shaped pulse is developed for pulse amplification. In general, there are two methods of parabolic pulse generation available in the fibers.

A first method includes parabolic pulse generation in the fiber amplifiers. This method uses an amplifying medium which has a broad enough gain bandwidth to support an asymptotic self-similar pulse propagation. A second method is based on passive fibers. For both cases, in the presence of normal dispersion, asymptotic self-similar pulse propagation can be achieved when the seed pulses with a bandwidth sufficiently smaller than the gain bandwidth propagate in the amplifier with negligible gain saturation. In such systems, Self-phase modulation (SPM) induced linear chirp can be preserved during amplification without suffering spectral and temporal intensity profile distortion. Otherwise, the bandwidth limitation must be overcome by means of active spectral phase control to compensate undesired higher order phase distortion.

Parabolic pulse formation in highly nonlinear fiber amplifiers can be effectively described by the modified nonlinear Schrodinger equation:

$$\frac{\partial A}{\partial z} = -\frac{i}{2}\left(\beta_2 + i\frac{g}{\Omega_g^2}\right)\frac{\partial^2 A}{\partial t^2} + i\gamma|A|^2 A + \frac{1}{2}(g-\alpha)A \quad (1)$$

where g and α are the intensity gain and loss per unit length, $\Omega_g$ is the gain bandwidth, and $\beta_2$ is the group velocity dispersion (GVD). Self-phase modulation (SPM) is governed by the nonlinearity parameter $\gamma=2\pi n_2/\lambda F$, where $n_2$ is the nonlinear refractive index and λ is the center wavelength and F is effective core area in the fiber amplifier.

Parabolic pulse generation and propagation is possible only when the input pulse has sufficient enough energy to create SPM to accumulate quadratic phase through the normal dispersive media. In other words, it is clear that the mutual balance between normal dispersion and nonlinearity will support the parabolic temporal profile through the pulse propagation in the fiber. Ultimately, this parabolic amplification strongly dependent on fiber engineering. So this process is complicated to implement.

Applicants disclose the ultrashort pulse amplification without pulse stretching and compressing devices by using an extremely large core diameter and a very short length rare-earth doped gain fibers. The combination of an extremely large core diameter and a very short length gain fiber can effectively suppress the optical nonlinearity. Ultrashort pulse seed laser with pulse with from 200 ps to 200 fs can be amplified to more than 1 μJ pulse energy and more than 200 kW.

While the preferred embodiments of the present invention have been illustrated in detail, it should be apparent that modifications and adaptations to those embodiments may occur to one skilled in the art without departing from the scope of the present invention.

We claim:

1. A 1.51 to 1.65 micron wavelength ultrashort pulse fiber amplifier with pulse width from 200 ps to 200 fs, comprising an Erbium doped multicomponent glass gain fiber for laser amplification from 1.51 to 1.65 micron wavelength, comprising:

a core; and
a cladding;
wherein:
  said core comprises at least 2 weight percent glass network modifier selected from BaO, CaO, MgO, ZnO, PbO, $K_2O$, $Na_2O$, $Li_2O$, $Y_2O_3$, or combinations thereof; and
  erbium oxide at a level from about 0.5 to about 20 weight percent;
wherein:
  a step index difference between the core and the cladding is configured to guide a mode of the core;
  a numerical aperture of the gain fiber is between 0.01 and 0.04;
  a core diameter is from about 30 microns to about 90 microns;
  a length of the gain fiber is shorter than 60 cm;
said fiber amplifier comprising no pulse-stretching devices and no pulse-compressing devices.

2. The fiber amplifier of claim 1, wherein said erbium oxide is present at a level from about 1 to about 5 weight percent.

3. The fiber amplifier of claim 1, wherein the core diameter is from about 35 microns to about 60 microns.

4. The fiber amplifier of claim 1, wherein the length of the gain fiber is from about 4 cm to about 45 cm.

5. The fiber amplifier of claim 1, wherein the gain fiber includes a polarization maintaining fiber.

* * * * *